Oct. 26, 1954
C. DUCOT ET AL
2,692,986
METHOD AND SYSTEM FOR GUIDING DIRIGIBLE CRAFTS
Filed Feb. 17, 1949
3 Sheets-Sheet 1
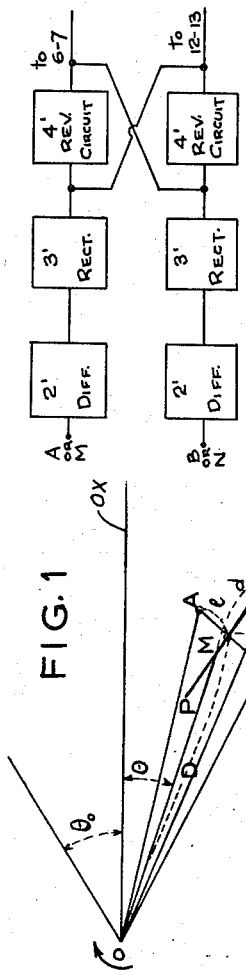
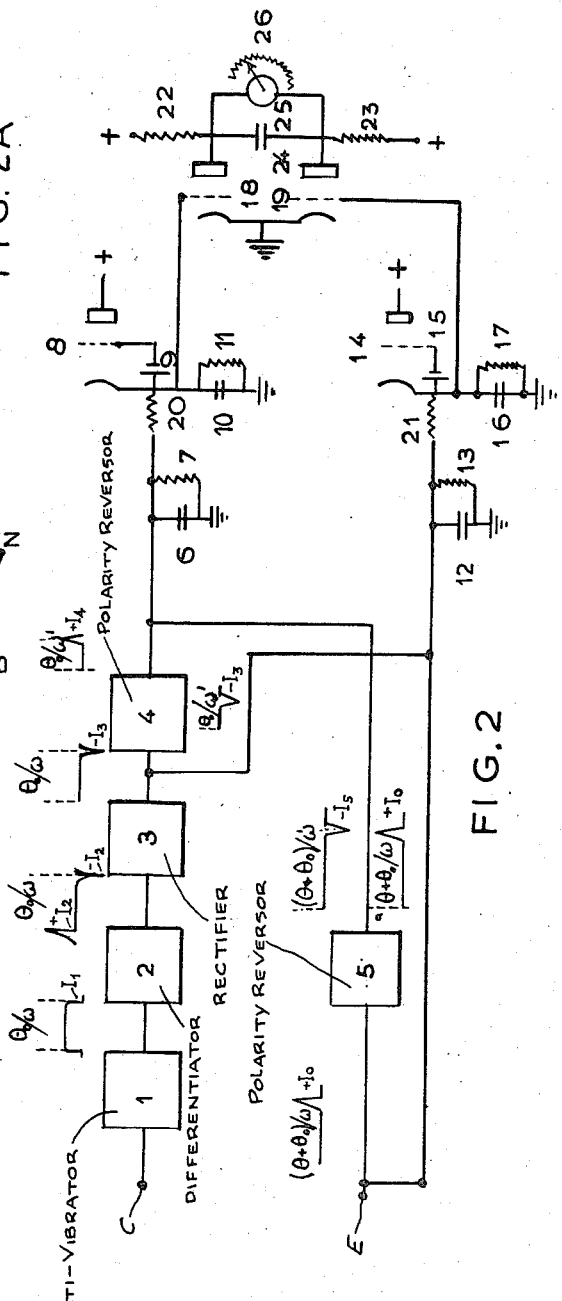
Inventors
Claude Ducot and
Pierre Perillhou
by Brown & Seward
Attorneys Oct. 26, 1954  C. DUCOT ET AL  2,692,986
METHOD AND SYSTEM FOR GUIDING DIRIGIBLE CRAFTS
Filed Feb. 17, 1949  3 Sheets-Sheet 2

Inventors
Claude Ducot and
Pierre Perilhou
by Brown + Seward
Attorneys

Oct. 26, 1954    C. DUCOT ET AL    2,692,986
METHOD AND SYSTEM FOR GUIDING DIRIGIBLE CRAFTS
Filed Feb. 17, 1949    3 Sheets-Sheet 3

Inventors
Claude Ducot and
Pierre Perilhou
by Brown & Seward
Attorneys

Patented Oct. 26, 1954

2,692,986

UNITED STATES PATENT OFFICE 2,692,986

METHOD AND SYSTEM FOR GUIDING DIRIGIBLE CRAFTS

Claude Ducot, Neuilly-sur-Seine, and Pierre Perilhou, Clamart, France, assignors to Office National d'Etudes et de Recherches Aeronautiques, Paris, France, a French company Application February 17, 1949, Serial No. 77,024

Claims priority, application France February 19, 1948

15 Claims. (Cl. 343—106)

This invention relates to the problem of guiding a dirigible craft and, more particularly, of an aircraft following a predetermined path by means of radiant or wave energy.

An object of the invention is to provide an improved method and means whereby a dirigible craft may be automatically guided toward and along a predetermined path fixed with respect to ground and this by causing the controls of the craft to impart to the displacement of the craft at any moment a predetermined direction, this direction being itself determined by the coordinates of the geographical position of a point of the craft at the given instant, it being understood that this position being defined independently of the orientation of the craft about said point.

There are known at present several systems of automatic guiding of dirigible crafts, one of said systems consisting in making the turn control of the craft directly dependent on the position of a point of the craft in space without regard to the path angle of the craft. In another system the same arrangement is reduced to practice by introducing therein a correction related to a derivative with respect to time of one of the coordinates of position of said point of the craft. Finally, in a still other system, the turn control of the craft is made dependent on the bearing of a fixed point on the ground with respect to a line of reference on the craft such as the longitudinal axis thereof, said fixed point on the ground being, at least for some time, a point of destination of the craft.

The first of these systems possesses the disadvantage of rendering the turn control of the craft directly dependent on the position in space of a point of the craft, whereas a turn of the craft acts but indirectly and more slowly on this position by the intermediary of the path angle of the craft. Thus, the most suitable turn to be produced at every instant being dependent on the path angle and not only on the position of said point of the craft at a said instant, it is possible that cases may occur when the controlled turn is incorrect.

The second system eliminates partially the above disadvantage; however, in this system again, except for the correction mentioned above, the turn of the craft is made dependent on the coordinates of position of a point of the craft, whilst taking into account the fact that a turn affects directly but the course angle, it is apparently more advantageous to render the control of a turn of the craft dependent only on the actual and ideal values of the course angle of the craft, said ideal values of the course angle being at every instant related to the geographical position of the craft.

Finally, the third system, which undoubtedly is capable of rendering a useful service in numerous circumstances, is ineffective to cause the craft to follow a predetermined path, but permits to orient the craft towards a predetermined point. This is immediately apparent from the consideration of the fact that the turn control in this case is no more dependent, even indirectly on the position of a point of the craft in space, but only on the bearing of a point of destination with respect to a reference axis, such as the longitudinal axis, fixedly related to the craft.

The improved method of guiding a dirigible craft toward and along a predetermined path relative to the ground, according to the invention, permits to eliminate the disadvantage of the above mentioned prior art systems.

According to this new method of guiding a dirigible craft toward and along a predetermined path relative to the ground, the turn of the craft is controlled at every instant so as to cause the craft to assume an ideal path angle, and it is only this ideal path angle which is made dependent on the position in space of a point of the craft.

More particularly, the method according to the invention consists, once a predetermined track or path is defined by an axis passing through a fixed point on the ground, in directing, bringing back and maintaining a dirigible craft on said axis by subjecting at any moment the turn control of the craft to a control action effective to give, to the tangent of the angle formed between the path followed by the craft and a straight line joining said fixed point on the ground to a point on the craft, a value dependent on, and more particularly proportional to, as to its amplitude and sign, the angle formed at the same instant between said straight line and the axis defining the path or track to be followed by the craft with respect to ground.

According to a feature of the invention the new method of guiding a craft toward or along a predetermined path consists in governing at any instant the control surfaces of the craft, so as to cause the craft to turn, so that the angle $\varphi$, formed by the reference or longitudinal axis of the craft and the straight line joining a point on the craft to a fixed point on the ground which may constitute its point of destination, remains substantially equal to an ideal angle $\psi$, such that its tangent tg $\psi$ be equal to $K\theta$, or $$\text{tg } \psi = K\theta$$

where $K$ is a positive constant greater than unity and $\theta$ is the angle formed between the desired direction of guidance and the straight line joining a point on the craft to the fixed point on the ground or point of destination of the craft.

According to another feature of the invention, the new method of guiding a craft following a predetermined path consists in causing the craft to follow a trajectory defined in polar coordinates with respect to a fixed point on the ground by the relation:

$$\rho = \frac{\rho_0}{\theta_0^{1/K}} \cdot \theta^{1/K}$$

in which K is a positive constant greater than unity; $\rho$ and $\rho_0$ on the one hand, and $\theta$ and $\theta_0$ on the other hand designate, respectively, radii-vectors and polar angles of the craft's position counted from the axis of the desired direction of guidance, values $\rho$ and $\theta$ corresponding to a given instant and values $\rho_0$ and $\theta_0$ corresponding to an initial position of the craft defined as being the point from which, as a result of the operation of the system, angle $\varphi$ may be considered to be equal to its ideal value $\psi$.

In accordance with another feature of the invention, the turn control of the craft is made dependent on angle $\theta$, formed at any instant between straight line joining the point of location of a radio beacon of a rotating or angularly movable beam type to the point of location of the craft and the desired direction of guidance, the control depending on said angle being derived from a measure of time interval $T_1$ elapsing between the instants of passage of the rotating beam by said desired direction of guidance and the aerial placed on the longitudinal axis of the craft, this time interval $T_1$ being defined by the relation:

$$T_1 = \theta/\omega$$

in which $\omega$ is the angular speed of rotation of the beam of the radio beacon.

According to another feature of the invention, the turn control of the craft is effected furthermore as a function of an interval of time $T_2$ elapsing between the instants of passage of the rotating beam by two receiving aerials placed at the extremities of the wings of the craft and as a function of a time interval $T_3$ separating the instants of passage of the rotating beam by two receiving aerials disposed on the longitudinal axis of the craft, the first of said two time intervals, namely $T_2$, measuring the distance D to the point of location of the radio beacon, and the second, namely $T_3$, measuring the angle $\varphi$ formed between the longitudinal axis of the craft and the instantaneous direction toward the radio-beacon.

According to a still further feature of the invention, the turn control of the craft may be arranged alternately to be additionally dependent on a time interval $T_2$ separating the instants of passage of the rotating beam by two aerials placed at the extremities of the wings of the craft and a time interval $T_3$ separating the instants of passage of the rotating beam by the mid-distance point of said spanwise arranged aerials and an aerial located at a point on the longitudinal axis of the craft outside of the base line formed by said two aerials, the first of said two time intervals, namely $T_2$, measuring the distance to the point of location of the radio-beacon, and the second, namely $T_3$, measuring angle formed between the longitudinal axis of the craft and the instantaneous direction toward the radio-beacon.

The invention consists furthermore in a new method of guiding a craft following a desired path, which consists in controlling at every instant the turn of the craft as to its amplitude and direction proportionally to a displacement function of the craft from the prescribed path, given by the relation:

$$\Delta = K' T_1 T_2 - T_3$$

where $\Delta$ designates a difference, $K'$ is a constant for a given disposition of receiving aerials on the craft and a given speed of beam rotation, $T_1$ is a time interval elapsing between the instants of passage of the rotating beam by said desired direction of guidance and a point of the craft and giving the measure of lateral displacement of the craft from the direction of guidance, $T_2$ is a time interval between the instants of passage of the beam by two spanwise located aerials and measuring the distance D to the point of location of the beacon and $T_3$ is the time interval between the instants of passage of the beam by two points of the craft spaced apart along its longitudinal axis and measuring the angle between this longitudinal axis of the craft and the direction of guidance towards said beacon.

The method of guiding a dirigible craft according to the invention is furthermore characterized by introduction of a correction corresponding to a drift of the craft, which may be caused by lateral wind or currents components, this correction being effected by changing the turn control applied to the craft so as to cause the axis of the craft to assume at any moment a direction such that:

$$tg\ \varphi = K(\theta - \theta_1)$$

where $\varphi$ is the angle formed by the axis of the craft and the direction toward a point of destination, $\theta$ is the angle formed by the direction toward the point of destination and the path relative to the ground that it is desired to follow and $\theta_1$ is a fixed angle which is determined as a function of the wind vector and the air speed of the craft and K is a positive constant greater than unity.

The invention consists furthermore in apparatus or devices permitting to effect an automatic guiding of a craft in accordance with the method and features set forth above and, more particularly, in the provision of electrical devices permitting to present or materialize the time intervals $T_1$ $T_2$ and $T_3$ intended to control the craft, in the form of electrical control potentials, as well as in a control arrangement in which the turn control of the craft is effected by means of an automatic pilot controlled as a function of an electric potential proportional to a displacement of the craft given by the above specified relation:

$$\Delta = K' T_1 T_2 - T_3$$

where $\Delta$ designates a difference and $K'$ is a constant for a given disposition of receiving aerials on the craft and a given speed of beam rotation.

The above and other objects and features of the invention will appear more clearly from the following description and the accompanying drawings, showing by way of example an embodiment of the equipments or apparatus permitting to effect an automatic guiding of the craft in accordance with this invention, it being understood however that these drawings are given for the purpose of illustration only and should not be taken as defining in any way the scope of this invention, for which the reference is to be made to the accompany claims.

In said drawings:

Fig. 1 shows a diagram illustrating one form of reduction to practice of the method according to the invention, Fig. 2 shows a schematic circuit diagram of a preferred embodiment of a piece of apparatus according to the invention, Fig. 2A represents a modified portion of Fig. 2.

Figure 3:
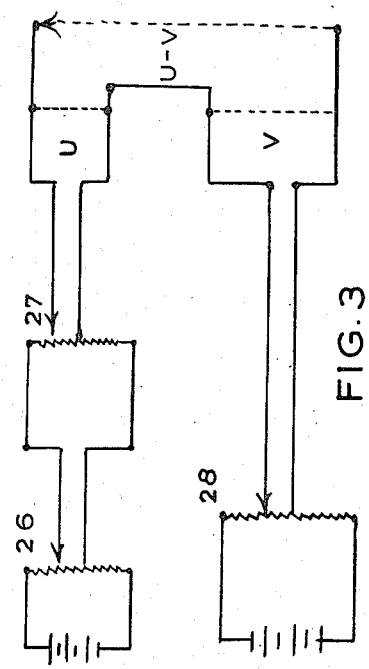
Fig. 3 shows a schematic circuit diagram of another portion of the apparatus according to the invention.

The invention will be described in its application to the guiding of a craft towards a landing point. The landing ground and the craft will be assumed to be equipped with devices permitting to effect a blind landing of the craft in accordance with a method described in an earlier application of the same applicants, filed under Serial No. 50,514 of September 22, 1948, now Patent No. 2,677,820 issued May 4, 1954. As more fully described in said earlier application this method of blind landing consists briefly in providing at the remote end of the landing strip an ultra short wave radio electric transmitter adapted to produce a sharply defined beam of radiant energy rotating at a constant angular speed in azimuth and which is further adapted to produce an omni-directional signal each time said beam passes by a direction making a predetermined fixed angle $\theta_0$ with the axis of said landing strip. This omni-directional signal is transmitted on a wave length different from that of the rotating beam. Then, the craft, in accordance with said method, is provided with two independent receiving aerials fixed at the opposite extremities of the wings of the craft, so as to be symmetrically located on either side of its longitudinal axis and at a distance $2l$ one from the other, these aerials being adapted to receive signals due to the passage of the rotating beam. Finally, the craft is provided with a third aerial which may be fixed at any point of the craft and which may be the usual communication antenna, this aerial being adapted to receive the omni-directional signal defining the passage of the rotating beam by the direction making a predetermined angle $\theta_0$ with the axis of the landing strip. Angle $\theta$ formed between the straight line joining the beam transmitter to the craft and the axis of the landing strip is related by a linear dependence or function to the time interval which separates the instant of reception of the omni-directional signal from the instant of passage of the rotating beam by the midway point between the two aerials placed on the wing tips of the craft. On the other hand, when the axis of the craft is directed towards the beam transmitter, distance D between said transmitter and the craft is reversely proportional to the time interval separating the instants of passage of the rotating beam by the points of said aerials at the wing tips.

The craft is assumed to be further equipped with an arrangement permitting to measure angle $\varphi$ formed at any moment between the axis of the craft and the straight line joining the craft to the beam transmitter according to the method described in the parent application, Serial No. 50,514 of the same applicant, filed September 22, 1948. In accordance, the method more fully described in said application, and considering the case of a blind landing system just mentioned, the craft may be provided with two additional receiving aerials located at two points on the longitudinal axis of the craft, spaced from each other by a distance $d$, and which are adapted to cooperate with the same rotating beam of radiant energy, the time interval separating the instants of passage of said beam by said two aerials being proportional to:

$$\frac{d \sin \varphi}{D}$$

Thus, in the above described system, the aircraft will be provided with a total of five receiving aerials.

According to the method disclosed in the mentioned application, considering again the case of a blind landing system, described in an earlier application of the same applicants, filed under Serial No. 50,514, of September 22, 1948, the craft may be provided with a single additional aerial located on the longitudinal axis of the craft and preferably towards its tail portion, at a distance $d$ from the mid-point of the distance separating two lateral aerials provided as previously mentioned at the wing tips. In such a case, it is the time interval which separates the instants of passage of the rotating beam by the tail aerial and the mid-point of the distance separating the two lateral aerials, that is proportional to:

$$\frac{d \sin \varphi}{D}$$

Thus, in this form of equipment the craft will be provided with four receiving aerials instead of five as in the preceding case.

Whatever may be the equipment, the method according to the present invention consists broadly in applying at any instant to the control surfaces of the craft a controlling action effective to cause the craft to turn so that angle $\varphi$ remains substantially equal to an angle $\psi$ such that $$\operatorname{tg} \varphi = K\theta$$

where K is a positive constant greater than unity.

This action being continuously applied, it is possible to figure out with a sufficient approximation the form of the trajectory which will be followed by the craft, by assuming that at any instant angle $\varphi$ is exactly equal to angle $\psi$.

It is possible to determine thus the equation of said trajectory in polar coordinates, taking as origin the fixed point on the ground at which is located the rotating beam transmitter, the polar angle $\theta$ of the position of the craft being measured from the axis of the landing strip and the corresponding radius-vector being designated by $\rho$. The theory of curves in polar coordinates permits, by a simple computation, to arrive at the following equation of said trajectory:

$$\rho = \frac{\rho_0}{\theta_0^{1/K}} \cdot \theta^{1/K} \quad (1)$$

where $\rho_0$ and $\theta_0$ designate the polar coordinates of an initial position of the craft defined as the point from which on, as a result of the operation of the control system, angle $\varphi$ may be considered as equal to its ideal value $\psi$.

From a consideration of the above equation, the following facts may be easily appreciated:

(1) The curve by equation (1) does not intersect the axis of the landing strip;

(2) Said curve closes in exactly and tangentially on said axis at a point of origin as $K > 1$;

(3) This curve becomes coincident practically with the axis of the landing strip from a point so more distant from the point of origin than K is greater.

A reduction to practice of the method of the invention will now be described, assuming that the craft is provided with an equipment such as mentioned previously in the first place, namely one comprising the use of five separate receiving aerials. Referring to Fig. 1 of the drawings, the reference letter O designates the transmitter of a rotating beam of radiant energy, OZ the direction of said rotating beam at the instant at which the omni-directional signal is transmitted, OX the axis of the landing strip, A and B the two aerials placed at the wing tips of the craft, M and N the two aerials placed on the longitudinal axis of the craft, this latter, not shown, being replaced by its longitudinal axis NP. Finally, previously mentioned factors: $\theta_0$, $\theta$, D, $l$, $d$ and $\varphi$ are also indicated in said figure.

It is to be noted first that, whilst in the blind landing system, described in the earlier application of same applicants hereabove mentioned, the measure of angle $\theta$ was based on the determination of the mid-point of the time interval separating the instants of passage of the rotating beam by two aerials, such as A and B, the existence in the present case of an auxiliary aerial M permits to effect this measure in a simpler manner. This is effected by measuring angle $\theta$ corresponding to point M, which angle is practically equal to that corresponding to the mid-point of distance AB. As a result, in such a case, it is not absolutely necessary to have aerial M exactly on the straight line joining the two aerials A and B. On the other hand, the receiving aerial adapted to receive the omni-directional signal is not shown.

According to a feature of the invention, the measure of angle $\theta$ is effected as follows: the time interval, separating the instants of passage of the rotating beam by axis OX and by the point of location of aerial M, is equal to:

$$T_1 = \theta/\omega$$

where $\omega$ is the angular speed of rotation of the

An electrical circuit permitting to obtain a continuous electric potential proportional in amplitude and polarity to time interval $T_1$ and hence to $\theta$, is schematically represented in Fig. 2.

At each period corresponding to a complete revolution of the rotating beam, the omni-directional signal received on the craft is applied after its detection by means, not shown, to terminal C of a time measuring circuit arrangement for triggering a multi-vibrator 1, so as to set the same in operation to produce a single signal pulse $I_1$ of a substantially rectangular shape and of a duration equal to $\theta_0/\omega$. This signal pulse $I_1$ is fed into a differentiator circuit 2 which provides at its output two short duration pulses, one, $+I_2$, of a certain polarity, for instance positive, at the beginning of the preceding rectangular pulse $I_1$, and another, $-I_2$, of opposite polarity, which, in the assumed case, will be negative, at the end of said rectangular pulse. These two successive signal short duration pulses $+I_2$, $-I_2$ are sent into a rectified circuit 3, which suppresses the first of said pulses and permits the passage of the second, which becomes $I_3$. The instant corresponding to said last signal pulse $I_3$ is precisely that of the passage of the rotating beam by the axis of the landing strip. This latter signal pulse $I_3$, which, in the present instance, has a negative polarity, is used then for the purpose of controlling the following circuit arrangement, on one hand directly and, on the other hand through a reversing circuit 4, which converts it in an identical signal pulse $I_4$, but of positive polarity.

Besides, each time when the rotating beam passes by or sweeps aerial M, a signal pulse received by said aerial after amplification and detection, for instance in the positive sense, as shown in $I_0$ by means not shown, and is applied to terminal E to be used then as the preceding signal pulse for the control of the following circuit arrangement, on one hand, through a reversing circuit 5 which transforms it into a negative pulse $I_5$, and, on the other hand, directly. It must be noted that it is also possible, according to another embodiment of the invention, to produce simultaneously, upon reception of a signal due to the passage of the beam by aerial M, two short duration pulses of opposite polarity, by means of two detectors connected in opposite sense. It will be assumed however in the following that the signal pulse received by aerial M after its detection is used according to the diagram shown in Fig. 2.

Signal pulse $I_4$ at the output of reversing circuit 4 and signal pulse $I_5$ at the output of reversing circuit 5 are applied in parallel to a resistance-capacity circuit combination of a suitable time constant comprising a condenser 6 and a resistance 7.

Signal pulse $I_3$ from the output of rectifier 3 and signal pulse $I_0$ resulting directly from the detection of a signal pulse received by aerial M are applied in parallel to another resistance-capacity circuit combination identical to the preceding one and formed by a condenser 12 and a resistance 13

These circuits are adjusted in such a manner that signal pulses $I_4$, $I_5$, $I_3$ and $I_0$ correspond respectively, except for the sign, to a same electrical charge $q$ supplied, respectively, to condenser 6 or to condenser 12.

The time constant of both resistance-capacity circuits 6—7 and 12—13 is given a relatively great value with respect to time intervals corresponding to the sweeping of angles $\theta_0$ and $\theta$, and sufficiently small with respect to the period $2K/\omega$ of a complete revolution of the rotating beam.

It results from the above described arrangements that:

If the sense of $\theta$ is that of the rotation of the beam, i. e. if the beam passes by aerial M after having passed by the axis of landing strip, signal pulse $I_4$ communicates to condenser 6 an electrical charge $+q$ and signal pulse $I_5$ upon its arrival acts to nullify this charge, so that at every cycle during a time interval equal to $T_1=\theta/\omega$, the grid of a triode tube 8, connected to resistance-capacity circuit 6—7 and normally maintained at cut-off point by battery 9, is brought to a potential exceeding the above bias by a value $q/C$, C being the capacity of condenser 6. During the same time interval, the grid of a triode tube 14, connected to resistance-capacity circuit 12—13 and which normally is also biased to cut-off, is brought to a potential still lower. Consequently, only tube 8 is conducting during said time interval $T_1$ and the anode current of said tube remains substantially constant, actually so more constant as it is more approaching the point of saturation, causing, a progressive charging of a condenser 10, shunted by a resistance 11, in the plate circuit of said tube between its cathode and the ground.

If the sense of $\theta$ is opposite to the direction of rotation of the beam, it is triode tube 14, which during a time interval $T_1$ elapsing between pulses $I_0$ and $I_3$ that is conducting and produces a current of a substantially constant value which progressively charges a condenser 16, shunted by a resistance 17, in the plate circuit of said tube between its cathode and the ground, while tube 8 remains with a grid potential smaller than that of the cut-off. It is understood that circuit elements 12, 13, 14, 15, 16, 17 and 21 are identical to circuit elements 6, 7, 8, 9, 10, 11 and 20. The respective points of connection of the cathodes and their corresponding capacity and resistance combinations 10—11 and 16—17 of two tubes 8 and 14 are connected to control a normally balanced symmetrical circuit arrangement formed by two triode tubes 18 and 19 feeding differentially a measuring instrument 25.

Accordingly, depending on the sense and the value of time interval $T_1$, the symmetrical circuit arrangement formed by tubes 18 and 19 is brought out of balance in such a manner that the mean potential difference at the terminals of measuring apparatus 25 is proportional in amplitude and polarity to time interval $T_1$ and hence to angle $\theta$. This results from the fact that an integration effect is produced at the same time by capacity-resistance circuits 10—11 or 16—17, by a capacity 24 connected across the terminals of measuring apparatus 25, as well as by a proper inertia of said apparatus.

The pointer of measuring apparatus 25, or in general a moving arm controlled thereby, is provided with a brush or a moving contact adapted to slide over a potentiometric resistor 26 provided with a central tap, the whole being arranged so that displacements of said brush with respect to said central point of the potentiometric resistor are proportional in amplitude and direction to $T_1$.

Two devices, similar to that just described, except for the omission of the multivibrator 1 (there is no need to produce a signal delayed with respect to a received signal) and having their branches identical, will permit to obtain displacements of movable potentiometer taps or contacts, respectively proportional in amplitude and direction on one hand to a time interval $T_2$ elapsing between the instants of passage of the rotating beam by wing tip aerials A and B and, on the other hand, to a time interval $T_3$ elapsing between the instants of passage of the beam by aerials M and N on the longitudinal axis of the craft. One of such devices is shown, in part, in Fig. 2A, which corresponds to the left half of Fig. 2; parts corresponding to the right half of Fig. 2 are included in each of said devices, but are omitted from Fig. 2A to avoid repetition.

Referring again to Fig. 1, it is readily apparent from a consideration of said figure that the following relations exist between the various factors previously discussed:

$$T_1 = \theta \cdot \frac{1}{\omega}$$

$$T_2 = \frac{2l \cos \varphi}{D} \cdot \frac{1}{\omega}$$

$$T_3 = \frac{d \sin \varphi}{D} \cdot \frac{1}{\omega}$$

According to the method of the invention, it is desired that at any time the turn control applied to the craft be such that before the coordinates of the geographical position of the craft are allowed to change, to any substantial extent, angle $\varphi$ formed between the axis of the craft and the straight line OM be made equal to angle $\psi$ defined by the expression:

$$\operatorname{tg} \psi = K\theta$$

When $\varphi = \psi$, one can write:

$$\operatorname{tg} \varphi = K\theta$$

Or:

$$\operatorname{tg} \varphi = \frac{2l \cdot T_3}{d T_2}$$

and $$\theta = \omega T_1$$

As a result, if $\varphi = \psi$, one can write:

$$\frac{2l}{d} \cdot \frac{T_3}{T_2} = K \omega T_1$$

or else:

$$T_3 = K' T_1 T_2$$

with $$K' = K \omega \frac{d}{2l}$$

Consequently, a method for bringing angle $\varphi$ to value $\psi$ consists in causing the craft to turn by an amount which is proportional in amplitude and direction to the deviation given by the expression:

$$\Delta = K' T_1 T_2 - T_3$$

In practice, such a control may be applied to the craft by the intermediary of any known automatic pilot, preferably of an electronic type, by injection at suitable points of the control circuits thereof a control potential proportional to deviation $\Delta$ defined hereinabove.

In order to obtain such a control potential, an arrangement, such as illustrated in Fig. 3 of the drawings, may be used for the purpose. A potentiometer 26, such as previously described and indicated under the same reference numeral on Fig. 2 will be fed with a constant voltage. The potential available between its central point and its moving tap will be thus proportional to $T_1$. This latter potential may be used then in its turn as the feeding potential for a further potentiometer 27, which must present a higher resistance than potentiometer 26 and the moving tap of which is caused to deviate from the corresponding mid-point of said potentiometer proportionally to $T_2$. There is obtained thus at the output of said second potentiometer a voltage U proportional to $T_1 \cdot T_2$, i. e. a voltage proportional to $K' T_1 T_2$, thus:

$$U = \alpha K' T_1 T_2$$

On the other hand, a potentiometer 28, the moving tap of which is caused to deviate proportionally to $T_3$ may be fed by a constant potential of such a value that voltage V, available between its middle point and the moving tap, is equal to $\alpha T_3$ ($\alpha$ being the same as previously).

By connecting the outputs of potentiometers 28 and 27, so that two voltages U and V are opposed to each other, it is possible to obtain a potential $$W = U - V = \alpha(K' T_1 T_2 - T_3)$$

It is this voltage W which is to be applied to the turn control circuit, or circuits, of the automatic pilot to obtain the desired guiding of the craft in accordance with the method of this invention.

If difficulties are encountered in obtaining by the above described means that the voltage proportional to deviation $\Delta$ corresponds exactly to a value required for operating an automatic pilot, or else if in the absence of an automatic pilot, this voltage must operate directly a servo-motor, or servo-motors, it is possible within the scope of this invention, instead of obtaining this voltage by simply opposing voltages U and V, to use for this purpose a measuring instrument capable of producing a deviation proportional to the difference U—V and it is then this deviation which, being communicated for instance to the moving tap of an auxiliary potentiometer, will permit to obtain at the output of this latter control voltage $W = \alpha \Delta$ of any desired value.

It is also possible to control the turn of the craft in response to such a control voltage, by all or null method, the auxiliary potentiometer being replaced in such a case by two contacts.

Figure 4:
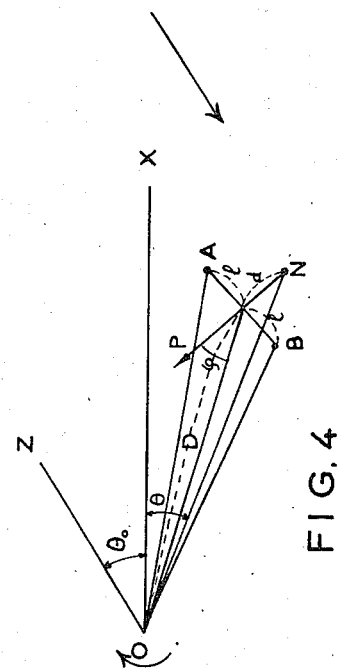
Fig. 4 is a diagram illustrating another form of reduction to practice of the method according to the invention.

There will be now described the application of the method according to the invention to an aircraft equipped with receiving arrangements according to the second of the two solutions previously suggested, and, namely, one comprising the use of four receiving aerials. Reference will be made now to Fig. 4 of the drawings in which O designates the transmitter of the rotating beam, OZ the direction of the rotating beam at the instant of transmission of the omni-directional signal, OX the axis of the landing strip, A and B the two aerials placed at the wing tips of the craft and, finally, N the aerial located at the tail portion of the craft, the latter, not shown, being replaced by its longitudinal axis NP. The previously mentioned factors $\theta_0$, $\theta$, D, $l$, $d$ and $\varphi$ are identical to those of Fig. 2. Again, the receiving aerial for the omni-directional signal is not shown in said figure.

The measure of angle $\theta$, i. e. of the time interval $T_1 = \theta/\omega$, where $\omega$ is again the angular speed of the rotation of the beam, is effected as in the first case, which was previously described, with the only exception that aerial N will be used instead of aerial M. Fig. 4 shows that the error thus made on the value of $\theta$ is negligible.

There again, it is by a device identical to that previously described with reference to Fig. 2 that is obtained a deviation of a potentiometer tap proportional in amplitude and sign to the time interval $T_2$, elapsing between the instants of passage of the rotating beam by the points of location of aerials A and B.

The only difference with respect to the first example resides therefore in the measure of the time interval $T_3$ elapsing between the instants of passage of the rotating beam by the mid-point of distance AB and by aerial N. If, on the other hand, the time interval elapsing between the instants of passage of the beam by the points of location of aerials A and N is designated by $T_4$, this latter may be expressed as a function of $T_2$ and $T_3$ as follows:

$$T_4 = \frac{T_2}{2} + T_3$$

or:

$$T_3 = T_4 - \frac{T_2}{2}$$

On the other hand, it is possible by a device previously described with reference to the first embodiment of the invention, to obtain a deviation of the moving tap of a potentiometer proportional in amplitude and sign to $T_4$.

Figure 5:
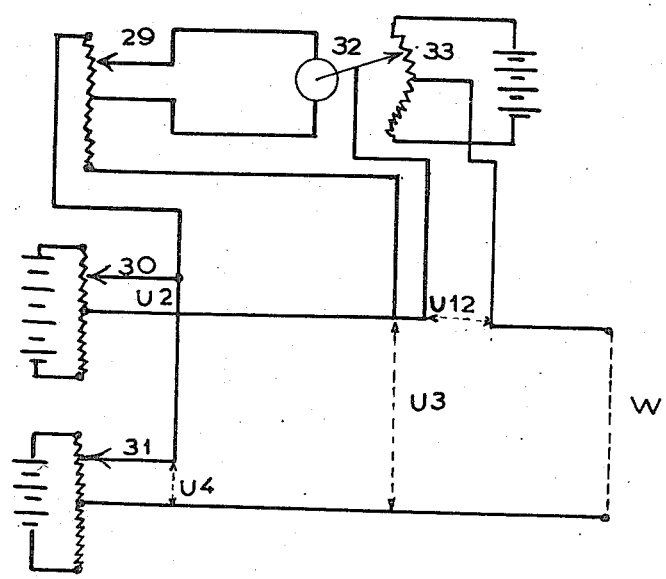
Fig. 5 shows a schematic circuit diagram of a piece of apparatus used in the second embodiment of the method according to the invention.

Referring now to Fig. 5, there is shown at 29 a potentiometer the moving tap of which deviates from its middle point proportionally to $T_1$, at 30 a potentiometer the moving tap of which deviates from its middle point proportionally to $T_2$, at 31 a potentiometer the moving tap of which deviates from its middle point proportionally to $T_4$ and at 33 a potentiometer the moving tap of which deviates from its middle point proportionally to $T_1 \times T_2$.

By feeding potentiometer 30 under a constant voltage, there is obtained between its middle point and its moving tap a voltage proportional to $T_2$, which may be represented by the following expression:

$$U_2 = \frac{\beta}{2} T_2$$

where $\beta$ is a constant.

In a similar way, by feeding potentiometer 31 under a constant voltage of a suitable value, there is obtained between its middle point and its moving tap a voltage proportional to $T_4$ and which may be represented by the following expression:

$$U_4 = \beta T_4$$

By opposing the two voltages $U_2$ and $U_4$, there is obtained a voltage $U_3$ given by the following equation:

$$U_3 = U_4 - U_2 = \beta \left( T_4 - \frac{T_2}{2} \right) = \beta T_3$$

By feeding, on the other hand, potentiometer 29 (supposed to be much more resistant than potentiometer 30), by a voltage $U_2$, one can obtain between its middle point and its moving tap a voltage proportional to $T_1 T_2$. This voltage is measured by an apparatus 32, the moving element of which actuates the moving tap of a fourth potentiometer 33. This latter potentiometer is fed by a suitably chosen constant voltage, so that the voltage produced between the mid-point and the moving tap of potentiometer 33, which is evidently proportional to $T_1 T_2$, is equal to $$U_{12} = \beta K' T_1 T_2$$

where K' has the previously indicated value with reference to the first embodiment of the invention, that is:

$$K' = K \omega \frac{d}{2l}$$

By connecting in opposition voltages $U_{12}$ and $U_3$, there is obtained finally the control voltage:

$$W = U_{12} - U_4 = \beta K' T_1 T_2 - \beta T_3 = \beta \Delta$$

This voltage may be used as in the first embodiment for controlling the turn of the craft by means of an automatic pilot.

The above embodiments of the invention, while being effective to guide a craft following a predetermined path toward a given fixed point on the ground in the absence of drift which may be caused by lateral winds, for instance is not capable to ensure said guiding in case of existance of drift conditions. In fact, if the craft is controlled in accordance with the method of the invention previously described, the axis of the craft will be oriented at any moment following a direction such as tg $\varphi = K\theta$. The craft cannot stabilize itself on axis OX since when it reaches this axis, one has $\varphi = 0$, and that consequently the true speed cannot be directed following the axis of the landing strip. In order to cause the craft to stabilize itself as regards its displacement on axis OX, it is necessary to apply to the system a correction depending on the drift. By designating by $\delta$ the drift angle computed from the wind and the air speed of the craft, in the case where its true speed is directed following the axis of the landing strip, it can be shown that for causing the craft to stabilize itself on axis OX, it is necessary that for $\theta=0$, one has tg $\varphi=-$tg $\delta$ and not tg$=0$.

A simple manner of obtaining this result is to correct the operation so that it has for its effect to give to the axis of the craft at every moment a direction such that:

$$\text{tg } \varphi = K\theta - \text{tg } \delta$$

But this relation may be written as follows:

$$\text{tg } \varphi = K(\theta - \theta_1)$$

where $\theta_1$ is a fixed angle which is determined as a function of the wind vector and the air speed of the craft. One has of course:

$$\theta_1 = \frac{\text{tg } \delta}{K}$$

and $\delta$ is given by a conventional and simple computation. It is sufficient therefore to apply the correction to the initial instant of the time interval $T_1$, that is on the duration of the substantially rectangular pulse produced by multivibrator $I$. For instance, this multivibrator may comprise a variable element controlled by a knob provided with an index movable in front of a dial graduated in units of drift angle for a certain value of K. It will be sufficient to adjust the correction before the flight (if the craft is pilotless) or during the flight (if there is a human pilot on board) as a function of meterorologic data.

Figure 6:
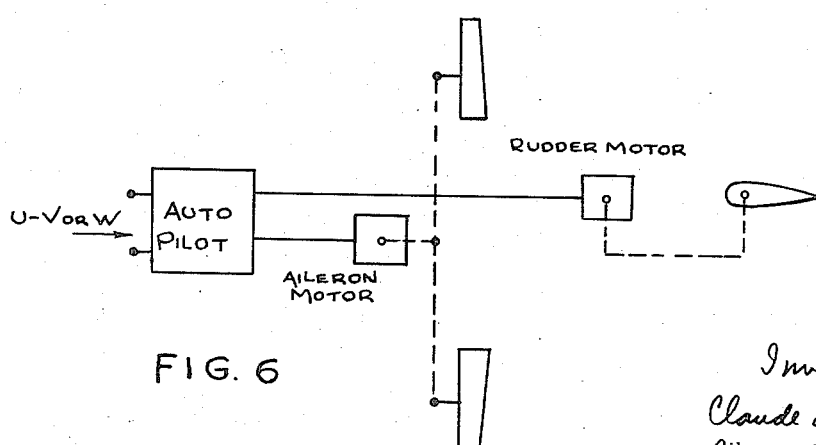
Fig. 6 is a diagrammatic representation of an "automatic pilot" adapted to actuate control surfaces of an aircraft in accordance with received signals.

Fig. 6 shows diagrammatically an automatic pilot device, known per se, which is associated with the receiving apparatus shown, so as to be controlled by the output voltage U—V (Fig. 3) or W (Fig. 4) of said receiving apparatus. The rudder and aileron operating devices (designated as "motors") are likewise conventional.

The invention provides thus a new and improved method of guiding a dirigible craft following a predetermined path or direction relative to the ground, as well as means for reducing it to practice.

It is understood that the invention is not limited to the specific embodiments described and illustrated, in which various modifications or alterations, evident to those skilled in the art, may be provided.

Thus, although the invention was described specifically in relation to radio-electric means of very high frequency, it is understood that this is not the only way in which it can be carried out in practice. Other radiations, such as luminous, or infra-red, can be used similarly to accomplish the object of this invention.

What is claimed is:

1. A system for automatically guiding a dirigible craft, such as an aircraft, toward and along a predetermined ground track defined by a straight line passing through a fixed point on the ground, comprising means for producing in relation to said ground track a directive beam of radiant energy angularly movable in azimuth, means for receiving said beam on the craft, means for transmitting a reference signal upon the passage of the beam through a reference position with respect to said track, means for receiving said reference signal on the craft, aircraft controls operative to change the craft's course and means using the received energy and said reference signal to apply to the controls of the craft a controlling action effective to cause the craft to turn, so that at any instant the angle $\varphi$ formed by the axis of the craft with a straight line joining a point on said craft to said fixed point on the ground remains substantially equal to an ideal angle $\psi$ such that tg $\psi = K\theta$, where K is a positive constant greater than unity and $\theta$ is the angle between the axis defining the ground track and the straight line joining the point of location of the craft to said fixed point on the ground.

2. A system for automatically guiding a dirigible craft, such as an aircraft, toward and along a predetermined track defined by a straight line passing through a fixed point on the ground, comprising means for producing in relation to said ground track a directive beam of radiant energy angularly movable in azimuth, means for receiving said beam on the craft, means for transmitting a reference signal upon the passage of the beam through a reference position with respect to said track, means for receiving said reference signal on the craft, aircraft controls operative to change the craft's course and means using the received energy and said reference signal to apply to the controls of the craft a controlling action effective to cause the craft to follow a trajectory defined in polar coordinates with respect to said ground track and said fixed point on the ground by a relation $$\rho = \frac{\rho_0}{\theta_0^{1/K}} \cdot \theta^{1/K}$$

where K is a positive constant greater than unity and $\theta$ and $\theta_0$ on one hand and $\rho$ and $\rho_0$ on the other hand designate respectively polar angles measured from the ground track axis and radii vectors corresponding thereto, for a craft's position at a given instant and an initial position defined as the point from which, as a result of the operation of the system, angle $\varphi$ may be considered as substantially equal to its ideal value $\psi$.

3. A system for automatically guiding a dirigible craft, such as an aircraft, toward and along a predetermined track defined by a straight line passing through a fixed point on the ground, comprising means for producing in relation to said ground track a directive beam of radiant energy of very high frequency angularly movable in azimuth with a constant speed, means for receiving said beam on the craft, means for transmitting a reference signal upon the passage of the beam through a reference position with respect to said track, means for receiving said reference signal on the craft, means for deriving from said received energy and said reference signal a first control potential dependent on the angle formed between the axis of said ground track and a straight line joining a point of the craft to the point of origin of the beam, a second control potential dependent on the distance of the craft to said point of origin and a third control potential dependent on the angle between the axis of the craft and the direction toward said point of origin, aircraft controls operative to change the craft's course and means controlling the heading of the craft in response to a combined function of said potentials, so that at any instant the angle $\varphi$ formed by the axis of the craft with a straight line joining a point on said craft to the point of origin of said beam remains substantially equal to an ideal angle $\psi$ such that tg $\psi = K\theta$, where K is a positive constant greater than unity and $\theta$ is the angle between the axis defining the ground track and the straight line joining said point on the craft to said point of origin of the beam.

4. A system for automatically guiding a dirigible craft, such as an aircraft, toward and along a predetermined track defined by a straight line passing through a fixed point on the ground, comprising means for producing in relation to said ground track a directive beam of radiant energy of very high frequency angularly movable in azimuth with a constant speed, means for receiving said beam on the craft, means for transmitting a reference signal upon the passage of the beam through a reference position with respect to said track, means for receiving said reference signal on the craft, means for deriving from said received energy and said reference signal a first control potential dependent on the angle formed between the axis of said ground track and a straight line joining a point of the craft to the point of origin of the beam, a second control potential dependent on the distance of the craft to said point of origin and a third control potential dependent on the angle between the axis of the craft and the direction toward said point of origin, aircraft controls operative to change the craft's course and means controlling the heading of the craft in response to a combined function of said potentials to cause the craft to follow a trajectory defined in polar coordinates with respect to said ground track and said fixed point on the ground by a relation $$\rho = \frac{\rho_0}{\theta_0^{1/K}} \cdot \theta^{1/K}$$

where K is a positive constant greater than unity and $\theta$ and $\theta_0$ on one hand, and $\rho$ and $\rho_0$ on the other hand designate, respectively, polar angles measured from the ground track axis and radii vectors corresponding thereto, for a craft's position at a given instant and an initial position defined at the point from which as a result of the operation of the system, angle $\varphi$ may be considered as substantially equal to its ideal value $\psi$.

5. A system for automatically guiding a dirigible craft, such as an aircraft, toward and along a predetermined track defined by a straight line passing through a fixed point on the ground, comprising means for producing in relation to said ground track a directive beam of radiant energy of very high frequency angularly movable in azimuth with a constant speed, means for receiving said beam on the craft, means for transmitting a reference signal upon the passage of the beam through a reference position with respect to said track, means for receiving said reference signal on the craft, means for deriving from said received energy and said reference signal a first control potential dependent on the angle formed between a straight line joining a point of the craft to the point of origin of the beam, a second control potential dependent on the distance of the craft to said point of origin and a third control potential dependent on the angle between the axis of the craft and the direction toward said point of origin, aircraft controls operative to change the craft's course and means controlling said aircraft controls in response to a combined function of said potentials, so that at any instant the angle $\varphi$ formed by the axis of the craft with a straight line joining a point on said craft to the point of origin of said beam remains substantially equal to an ideal angle $\psi$ such that tg $\psi = K(\theta - \theta_1)$, where K is a positive constant greater than unity and $\theta$ is the angle between the axis defining the ground track and the straight line joining said point on the craft to said point of origin of the beam, and $\theta_1$ is an angle accounting for drift compensation.

6. A system according to claim 5, which includes means for introducing a drift correction, said means varying the control potential measuring the time interval $T_1$ dependent on the angle $\theta$ between the ground track axis and the direction toward the point of origin of the beam.

7. A system for guiding a craft following a predetermined ground track comprising in combination means at one point on said track for transmitting a beam of radiant energy caused to periodically change its direction in azimuth at a constant speed, means for producing a reference signal indexing the passage of said beam through a predetermined position in relation to said track and means for receiving said beam and said reference signal on the craft, said means comprising at least three independent aerials for cooperation with said beam, one of which is located on the longitudinal axis of the craft and two others at the extremities of a base line transversal and symmetrical to said axis, and a separate receiving aerial intended for reception of said reference signal, receiver means associated with said aerials, time measuring circuit means interconnecting the outputs of receiver means of said reference signal aerial and the aerial on the longitudinal axis, for measuring the time interval between the instants of passage of the beam by the ground track axis and said aerial on the longitudinal axis to determine a factor depending on the value of angle $\theta$ between the desired ground track toward a point of destination and the direction toward said point from the point of location of the craft, time measuring means interconnecting the outputs of receiver means of said two lateral aerials to measure the time interval between the instants of passage of the beam by said aerials to determine a factor depending on the distance to the point of destination, time measuring means interconnecting the outputs of receiver means of one of said lateral aerials, and said aerial on the longitudinal axis to determine a factor depending on the value of angle $\varphi$ between the longitudinal axis of the craft and the direction toward the point of destination, variable potential generating means controlled by said time measuring means, means for combining the generated potentials proportional to said time interval measures to provide a resultant potential and means for controlling the craft in response to said resultant potential.

8. A system for guiding a craft following a predetermined ground track comprising in combination means at one point on said track for transmitting a beam of radiant energy caused to periodically change its direction in azimuth at a constant speed, means for producing a reference signal indexing the passage of said beam through a predetermined position in relation to said track and means on the craft for receiving said beam and said reference signal, said receiving means comprising four independent spaced aerials for cooperation with the beam two of said aerials being arranged at points located following the longitudinal axis of the craft and two others at points located following a transversal axis of the craft and a separate receiver aerial intended for reception of said reference signal, receiver means associated with said aerials, time measuring circuit means interconnecting the outputs of receiver means connected to said reference signal aerial and one of the aerials on the longitudinal axis of the craft for measuring the time interval between the passage of the beam by the ground track axis and said aerial on the longitudinal axis of the craft to determine a factor depending on the value of angle $\theta$ between the desired ground track toward a point of destination and the direction toward said point from the point of location of the craft, separate time measuring circuit means between the receiver means connected to each of said two pairs of aerials cooperating with the beam for determining respectively a factor depending on the distance to the point of destination and a factor depending on the value of angle φ between the longitudinal axis of the craft and the direction toward the point of destination, variable potential generating means controlled by said three time measuring circuit means, for combining the generated potentials proportional to said time interval measures to provide a resultant voltage and means for controlling the craft in response to said resultant voltage.

9. A system as claimed in claim 7 in which the variable potential generating means produce three potentials respectively proportional to time intervals $T_1T_2$ and $T_3$, which are respectively dependent on the angle between the ground track axis and the straight line joining the craft to the point of origin of the beam, on the distance to said point of origin and on the angle between the axis of the craft and said straight line, means for combining said potentials to produce a resultant potential proportional to $\Delta=K'T_1T_2-T_3$ where $\Delta$ designates a difference and $K'$ is a constant for a given disposition of receiving aerials on the craft and a given speed of beam rotation and means for controlling the craft in response to said combined potential.

10. A system as claimed in claim 8, in which the variable potential generating means produce three potentials respectively proportional to time intervals $T_1T_2$ and $T_3$, which are respectively dependent on the angle between the ground track axis and the straight line joining the craft to the point of origin of the beam, on the distance to said point of origin and on the angle between the axis of the craft and said straight line, means for combining said potentials to produce a resultant potential proportional to $\Delta=K'T_1T_2-T_3$ where $\Delta$ designates a difference and $K'$ is a constant for a given disposition of receiving aerials on the craft and a given speed of beam rotation and means for controlling the craft in response to said combined potential.

11. A system for guiding a craft following a predetermined ground track comprising in combination means at one point on said track for transmitting a beam of radiant energy caused to periodically change its direction in azimuth at a constant speed, means for producing a reference signal indexing the passage of said beam through a predetermined position in relation to said track and means on the craft for receiving said beam and said reference signal, said means comprising a plurality of independent receiving aerials located at different points of the craft, receiver means associated with said aerials, time measuring circuit means corresponding to different pair combinations of said aerials and connected to said receiver means to measure time intervals between passages of the beam by said aerials to determine navigational data for controlling the craft's course, variable voltage generating means controlled by said time measuring circuit means, means for interconnecting said variable voltage means to produce a resultant voltage constituting a combined function of said voltages and means for controlling the craft in response to said resultant voltage.

12. A system as claimed in claim 11 in which said variable voltage generating means comprise potentiometric devices associated in series and parallel combinations conjointly with constant D. C. potential sources, to provide a desired combination of control voltages.

13. A system as claimed in claim 11 in which said time measuring circuit means are sensitive to the time order in which the respective aerials are swept by said beam to differentiate the sense of control potentials depending on the relative position of the craft on one or the other side of the predetermined ground track.

14. A system as claimed in claim 11 in which said time measuring circuit means are sensitive to the time order in which the respective aerials are swept by said beam to differentiate the sense of control potentials depending on the relative position of the craft on one or the other side of the predetermined ground track, said means comprising means for producing short duration pulses of opposite polarity from signals of each of a pair of corresponding aerials, means comprising a two branch balanced time measuring circuit, means for applying to each branch of said last means signal pulses of one polarity from one of said aerials and signal pulses of opposite polarity from the other of said aerials, time constant circuit means of a capacity-resistance type in each branch of said balanced circuit, electronic tube means in each of said branches controlled by said time constant means to be conductive during the time interval separating a positive pulse from a negative pulse and a balanced electronic tube circuit differentially responsive to the conductive conditions of said first tube means and a differential measuring instrument controlled by said last electronic tube circuit.

15. Time measuring circuit arrangement for measuring a time interval between the instants of two receptions and sensitive to the time order of said receptions comprising means for producing short duration pulses of opposite polarity from signals of each reception, means comprising a two branch balanced time measuring circuit, means for applying to each branch of said last means signal pulses of one polarity from one of said receptions and signal pulses of opposite polarity from the other of said receptions, time constant circuit of a capacity-resistance type in each branch of said balanced circuit, electronic tube means in each of said branches controlled by said time constant means to be conductive during the time interval separating a positive pulse from a negative pulse and a balanced electronic tube circuit differentially responsive to the conductive conditions of said first tube means and a differential measuring instrument controlled by said last electronic tube circuit.

References Cited in the file of this patent

UNITED STATES PATENTS

| Number | Name | Date |
| --- | --- | --- |
| 1,890,786 | Johnston | Dec. 13, 1932 |
| 1,896,805 | Sperry et al. | Feb. 7, 1933 |
| 1,958,258 | Alexanderson | May 8, 1934 |
| 2,010,968 | Smith | Aug. 13, 1935 |
| 2,419,970 | Roe et al. | May 6, 1947 |

FOREIGN PATENTS

| Number | Country | Date |
| --- | --- | --- |
| 516,567 | Great Britain | Jan. 5, 1940 |